United States Patent
Ma

(10) Patent No.: US 8,830,992 B1
(45) Date of Patent: Sep. 9, 2014

(54) FABRIC CARD AND COMMUNICATIONS DEVICE

(71) Applicant: Huawei Technologies Co., Ltd., Shenzhen (CN)

(72) Inventor: Guoqiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/189,036

(22) Filed: Feb. 25, 2014

(30) Foreign Application Priority Data

Mar. 1, 2013 (WO) ................ PCT/CN2013/072073

(51) Int. Cl.
*H04L 12/50* (2006.01)
(52) U.S. Cl.
CPC ...................................... *H04L 12/50* (2013.01)
USPC ........... 370/359; 370/229; 370/412; 370/506; 398/3; 398/54; 398/98; 710/58
(58) Field of Classification Search
None
See application file for complete search history.

(56) References Cited

U.S. PATENT DOCUMENTS

| | | | | |
|---|---|---|---|---|
| 5,999,621 A | * | 12/1999 | Martin et al. | 379/438 |
| 6,597,689 B1 | * | 7/2003 | Chiu et al. | 370/354 |
| 7,079,485 B1 | * | 7/2006 | Lau et al. | 370/229 |
| 2005/0121989 A1 | * | 6/2005 | Suzuki | 310/156.06 |
| 2008/0112152 A1 | * | 5/2008 | Figueroa et al. | 361/826 |
| 2009/0003327 A1 | | 1/2009 | Zang et al. | |
| 2011/0302346 A1 | * | 12/2011 | Vahdat et al. | 710/301 |
| 2013/0210246 A1 | * | 8/2013 | Davis et al. | 439/65 |

FOREIGN PATENT DOCUMENTS

| CN | 101098238 A | 1/2008 |
|---|---|---|
| CN | 102315892 A | 1/2012 |

OTHER PUBLICATIONS

Foreign Communication From a Counterpart Application, PCT Application No. PCT/CN2013/072073, Chinese Search Report dated Dec. 5, 2013, 6 pages.
Foreign Communication From a Counterpart Application, PCT Application No. PCT/CN2013/072073, Chinese Written Opinion dated Dec. 5, 2013, 4 pages.

* cited by examiner

*Primary Examiner* — Ian N Moore
*Assistant Examiner* — Latresa McCallum
(74) *Attorney, Agent, or Firm* — Conley Rose, P.C.; Grant Rodolph

(57) ABSTRACT

The fabric card includes at least one fabric card chip and at least two fabric card connector groups, where each fabric card connector group of the at least two fabric card connector groups includes at least two fabric card connectors, the number of fabric card chips is less than the number of at least two fabric card connector groups, each fabric card chip of the at least one fabric card chip connects to all fabric card connectors in at least one fabric card connector group, all fabric card connectors in the fabric card connector group that connect to the fabric card chip exchange data using the fabric card chip. This fully utilizes an exchange capability of the fabric card chip and saves system resources.

10 Claims, 3 Drawing Sheets

FABRIC CARD AND COMMUNICATIONS DEVICE

CROSS-REFERENCE TO RELATED APPLICATION

This application claims priority to International Patent Application No. PCT/CN2013/072073, filed on Mar. 1, 2013, which is hereby incorporated by reference in its entirety.

TECHNICAL FIELD

This application relates to communications technologies, and in particular, to a fabric card and a communications device.

BACKGROUND

A line card and a fabric card are arranged inside a communications device. The line card in the communications device provides an interface for a user equipment and is a board used by the user equipment. The fabric card is a data exchange unit in the communications device. Different line cards exchange data using the fabric card. The fabric card is installed in a fabric card socket on a backplane using a fabric card connector, the line card is installed in a line card socket on the backplane using a line card connector, and the fabric card socket connects to the line card socket by means of wiring on the backplane, so that each fabric card connects to each line card and each line card connects to each fabric card.

Generally, the fabric card and the line card in the communications device mainly use an orthogonal connection architecture shown in FIG. 1 for connection. As shown in FIG. 1, multiple line cards 11 and multiple fabric cards 12 are separately installed in the communications device. Each line card 11 is installed in line card sockets (not shown in FIG. 1) on a backplane (not shown in FIG. 1) using line card connectors 15, and each fabric card 12 is installed in fabric card sockets (not shown in FIG. 1) on the backplane using fabric card connectors 16. The line card socket connected to each line card connector 15 and the fabric card socket connected to each fabric card connector 16 orthogonally connect to each other on the backplane, so that each line card 11 connects to every fabric card 12, and each fabric card 12 connects to every line card 11. A line card chip 13 is arranged on the line card 11. The line card chip 13 connects to all line card connectors 15 in the line card 11 and is used to exchange data between user equipments connected to the line card 11. A fabric card chip 14 is arranged on the fabric card 12. The fabric card chip 14 connects to all fabric card connectors 16 in the fabric card 12 and is used to exchange data between different line cards 11. Multiple fabric card sockets on the backplane that are used to install one fabric card are collectively referred to as one fabric card slot. Multiple line card sockets that are used to install one line card are collectively referred to as one line card slot. Multiple fabric card connectors 16 in one fabric card slot separately connect to different line cards 11 and are collectively referred to as one fabric card connector group; a fabric card 12 exchanges data between different line cards 11 using the multiple fabric card connectors 16 in a same fabric card slot. Multiple line card connectors 15 in one line card slot separately connect to different fabric cards 12, and one line card 11 and different fabric cards 12 are connected using the multiple line card connectors 15 in a same line card slot.

In a conventional communications device, at least one fabric card chip is arranged on a fabric card, and each fabric card chip on one fabric card provides data exchange only for one fabric card connector group. However, because the fabric card chip is a high-performance chip, there is redundancy in a data exchange capability of the fabric card chip and this causes a waste of system resources.

SUMMARY

This application provides a fabric card and a communications device, so as to fully utilize a data exchange capability of a fabric card chip and improve utilization of system resources.

A first aspect provides a fabric card, including: at least one fabric card chip and at least two fabric card connector groups, where each fabric card connector group of the at least two fabric card connector groups includes at least two fabric card connectors, and the number of the fabric card chips is less than the number of the at least two fabric card connector groups; each fabric card chip of the at least one fabric card chip connects to all fabric card connectors in at least one fabric card connector group, and all fabric card connectors in the fabric card connector group that connect to the fabric card chip exchange data using the fabric card chip; and a fabric card connector in one fabric card connector group can exchange data only with other fabric card connectors in a same fabric card connector group to which the fabric card connector belongs.

A second aspect provides a communications device, including: at least one fabric card mentioned above and at least two line cards, where each line card of the at least two line cards includes at least two line card connectors; and the number of fabric card connectors in each fabric card connector group on the at least one fabric card is the same, the number of fabric card connectors in each fabric card connector group is not less than the number of the at least two line cards, the number of the at least two line card connectors in each line card is the same as the total number of fabric card connector groups on the at least one fabric card, and each fabric card connector group connects to each line card using only one fabric card connector and one line card connector.

According to the fabric card and the communications device that are provided in this application, at least one fabric card chip and at least two fabric card connector connection groups are arranged on a fabric card, and the number of fabric card chips is less than the number of fabric card connector groups. Therefore, at least one fabric card chip provides data exchange for the at least two fabric card connector groups. This fully utilizes a data exchange capability of the fabric card chip and improves utilization of system resources.

BRIEF DESCRIPTION OF DRAWINGS

To describe the technical solutions in the embodiments of this application or in the prior art more clearly, the following briefly introduces the accompanying drawings required for describing the embodiments or the prior art. The accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of the embodiments of this application more clear, the following clearly describes the technical solutions in the embodiments of this application with reference to the accompanying drawings in the embodiments of this application. The described embodiments are merely a part rather than all of the embodiments of this application. All other embodiments obtained by a person of ordinary skill in the art based on the embodiments of this application without creative efforts shall fall within the protection scope of this application.

Figure 2:
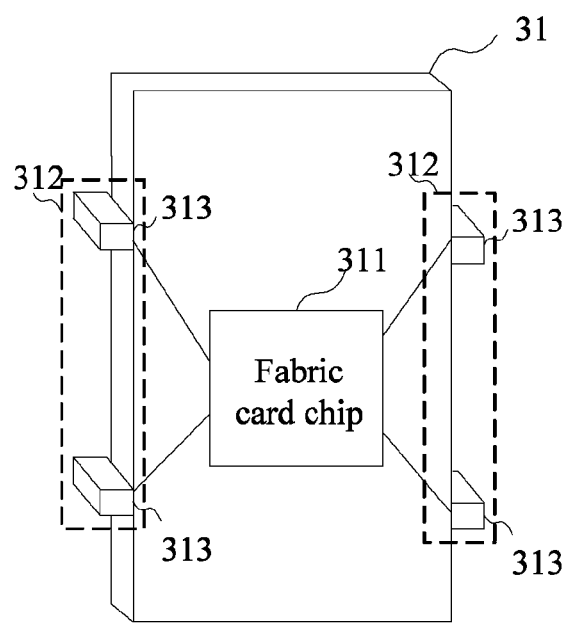
FIG. 2 is a schematic structural diagram of a first embodiment of a fabric card according to an embodiment of this application.

FIG. 2 is a schematic structural diagram of a first embodiment of a fabric card according to an embodiment of this application. As shown in FIG. 2, a fabric card 31 provided in this embodiment includes at least one fabric card chip 311 and at least two fabric card connector groups 312. Each fabric card connector group 312 includes at least two fabric card connectors 313, where the number of fabric card chips 311 is less than the number of fabric card connector groups 312. Each fabric card chip 311 connects to all fabric card connectors 313 in at least one fabric card connector group 312, and all fabric card connectors 313 in each fabric card connector group 312 exchange data using the fabric card chip 311. One fabric card connector group 312 indicates a combination of multiple fabric card connectors 313. A fabric card connector 313 in one fabric card connector group 312 can exchange data only with other fabric card connectors 313 in a same fabric card connector group 312 to which the fabric card connector 313 belongs. That is, a fabric card connector in one fabric card connector group cannot exchange data with other fabric card connectors in another fabric card connector group. Generally, the number of fabric card connectors in each fabric card connector group is the same; however, the number of fabric card connectors in each fabric card connector group may also be different.

In FIG. 2, an example in which a fabric card 31 includes one fabric card chip 311 and two fabric card connector groups 312, and each fabric card connector group 312 includes two fabric card connectors 313 is used for description. In another example, a fabric card may include two fabric card chips and three fabric card connector groups, and each fabric card connector group includes multiple fabric card connectors, where one fabric card chip connects to all fabric card connectors in one fabric card connector group, and the other fabric card chip connects to all fabric card connectors in the other two fabric card connector groups.

One fabric card connector group 312 may further connect to multiple fabric card chips 311 and concurrently exchange data using the multiple fabric card chips 311, so as to increase a data exchange capability. This is not limited in this application. In this application, multiple fabric card connector groups 312 connect to a same fabric card chip 311, so that a fabric card chip 311 may separately provide data exchange services for fabric card connectors 313 in the multiple fabric card connector groups 312. For example, a fabric card includes two fabric card chips and three fabric card connector groups, and each fabric card connector group includes multiple fabric card connectors. The two fabric card chips separately connect to all fabric card connectors in the three fabric card connector groups. Both the two fabric card chips ensure that a fabric card connector in one fabric card connector group can exchange data only with other fabric card connectors in a same fabric card connector group to which the fabric card connector belongs.

Specifically, in a conventional communications device, one fabric card has only one fabric card connector group. Therefore, a fabric card chip can exchange data only between at least two fabric card connectors in the one fabric card connector group. In this embodiment, one fabric card 31 has at least two fabric card connector groups 312, and the number of fabric card chips 311 is less than the number of fabric card connector groups 312. Therefore, at least one fabric card chip 311 on the fabric card 31 separately connects to each fabric card connector 313 in the at least two fabric card connector groups 312, so that the fabric card chip 311 may exchange data between fabric card connectors 313 in the two fabric card connector groups 312, thereby fully increasing a data exchange capability of the fabric card chip 311. Fabric card connectors 313 that belong to one fabric card connector group 312 need to connect to a same fabric card chip 311 and exchange data using the fabric card chip 311. If more than one fabric card connector group 312 connects to a same fabric card chip 311, each fabric card connector 313 in each fabric card connector group 312 can exchange, using the fabric card chip 311, data only with other fabric card connectors 313 in a same fabric card connector group 312 to which the fabric card connector 313 belongs, but cannot exchange, using the fabric card chip 311, data with other fabric card connectors 313 in a different fabric card connector group 312 to which the fabric card connector 313 does not belong.

Specifically, each fabric card chip 311 connects to a fabric card connector 313 using chip pins of the fabric card chip 311. The number of fabric card connectors 313 to which one fabric card chip 311 is capable of connecting is determined according to the number of chip pins on the fabric card chip 311 and a data exchange capability that can be provided by the fabric card chip 311. Generally, each fabric card chip 311 connects to a maximum of two fabric card connector groups 312.

In this embodiment, at least one fabric card chip, which connects to at least two fabric card connector groups, is arranged on a fabric card, and the number of fabric card chips is less than the number of fabric card connector groups. Therefore, the at least one fabric card chip provides data exchange for the at least two fabric card connector groups. This fully utilizes a data exchange capability of the fabric card chip and improves utilization of system resources.

Figure 3:
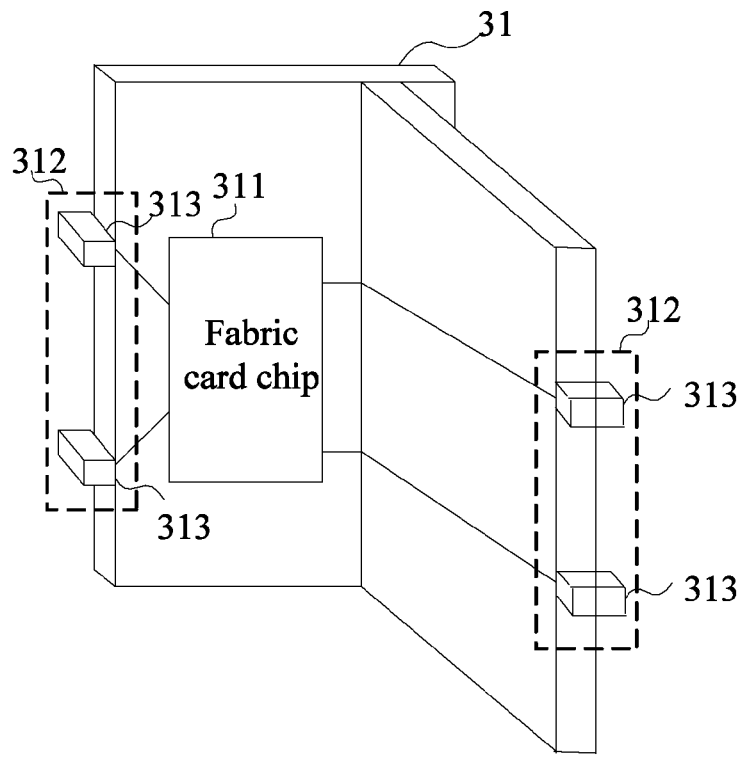
FIG. 3 is a schematic structural diagram of another implementation manner of a first embodiment of a fabric card according to an embodiment of this application.

In a conventional communications device, a fabric card is generally a planar board. For a purpose for implementing functions of the fabric card in the embodiment illustrated in FIG. 2, the fabric card may also be designed in various shapes, such as a "T" shape, an "L" shape, or an "H" shape. For example, the fabric card chip is arranged on a board, a fabric card connector group is arranged on the board on which the fabric card chip is arranged, and other fabric card connector groups are arranged on other boards that are perpendicular to the board, so as to implement the functions of the fabric card in the embodiment illustrated in FIG. 2. However, the fabric card provided in this application is not limited to the foregoing shapes, so long as the fabric card chip on the fabric card is capable of connecting to at least two fabric card connector groups. FIG. 3 is a schematic structural diagram of another implementation manner of a first embodiment of a fabric card according to an embodiment of this application. As shown in FIG. 3, the fabric card 31 is a T shape fabric card, a fabric card connector group 312 is arranged on each plane of the T shape fabric card, a fabric card chip 311 is arranged on one of the planes, and all fabric card connectors 313 in two fabric card connector groups 312 connect to the fabric card chip 311.

Besides the fabric card of the non-planar board form, based on the foregoing embodiment, the fabric card may further include one main card and at least one connection card. The number of the at least two fabric card connector groups 312 minus the number of the at least one connection card equals one. At least one fabric card chip 311 resides on the main card. One fabric card connector group 312 of the at least two fabric card connector groups 312 is arranged on the main card, and one fabric card connector group 312 of the at least two fabric card connector groups 312 is arranged on each connection card of the at least one connection card.

Figure 4:
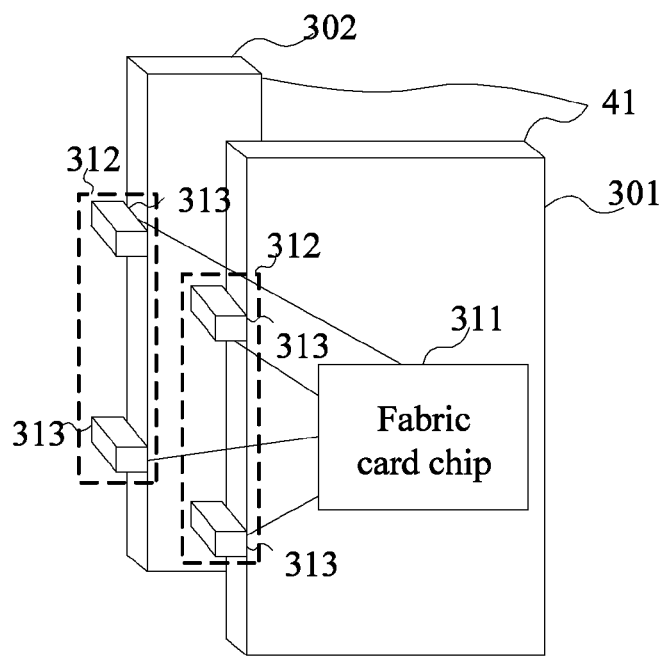
FIG. 4 is a schematic structural diagram of a second embodiment of a fabric card according to an embodiment of this application.

FIG. 4 is a schematic structural diagram of a second embodiment of a fabric card according to an embodiment of this application. As shown in FIG. 4, a fabric card 41 in this embodiment includes a main card 301 and at least one connection card 302. At least one fabric card chip 311 and one fabric card connector group 312 are arranged on the main card 301. One fabric card connector group 312 is arranged on each connection card 302. The total number of fabric card connector groups 312 on the fabric card 41 minus the number of connector cards 302 equals one. Each fabric card connector group 312 includes at least two fabric card connectors 313. At least one fabric card chip 311 connects to all fabric card connectors 313 in one fabric card connector group 312 on the main card 301 and connects to all fabric card connectors 313 in the at least one fabric card connector group 312 on the at least one connection card 302, which indicates that one fabric card chip 311 that connects to all fabric card connectors 313 in one fabric card connector group 312 on the main card 301 and in the at least one fabric card connector group 312 on the at least one connection card 302 exists; or one fabric card chip 311 connects to all fabric card connectors 313 in the at least two fabric card connector groups 312 on the at least one connection card 302. All fabric card connectors 313 in each fabric card connector group 312 that are arranged on the main board 301 or arranged on the connection card 302 exchange data using the same fabric card chip 311. In FIG. 4, an example in which the fabric card 41 includes one connection card 302, the main card 301 includes one fabric card chip 311, and each fabric card connector group 312 on the main card 301 and the connection card 302 separately includes two fabric card connectors 313 is used for description.

Specifically, all fabric card connectors in one fabric card connector group 312 on the main card 301 connect to the one fabric card chip 311 on the main card 301 by means of cabling on the main card 301, and all fabric card connectors in each fabric card connector group 312 that is arranged on the connection card 302 connect to the one fabric card chip 311 on the main card 301 using a connection wire.

Further, the fabric card 41 may further include, for example, two connection cards 302, the main card 301 includes two fabric card chips 311, each fabric card connector group 312 on the main card 301 and the connection card 302 separately includes two fabric card connectors 313. One fabric card chip 311 connects to one fabric card connector group 312 on the main card 301 and one fabric card connector group 312 on one connection card 302. Specifically, the fabric card chip 311 separately connects to all fabric card connectors 313 in one fabric card connector group 312 on the main card 301 by means of circuit board wiring on the main card 301; because the main card 301 and the connection card 302 are two independent cards, the fabric card chip 311 separately connects to all fabric card connectors 313 in one fabric card connector group 312 on one connection card 302 using a connection wire. The connection wire only needs to ensure that the fabric card chip 311 connects to all fabric card connectors 313 on the connection card 302, and a specific form of the connection wire is not limited. In addition, the other fabric card chip 311 on the main card 301 connects to one fabric card connector group 312 on the other connection card 302. Specifically, the other fabric card chip 311 also connects to all fabric card connectors 313 in one fabric card connector group 312 on the other connection card 302 using a connection wire.

Specifically, a fabric card in a conventional communications device includes one fabric card chip and one fabric card connector group. In this embodiment, at least one connection card on which at least one fabric card connector group is arranged connects to a fabric card with an existing structure without changing the existing structure of the fabric card in a communications device, so as to form the fabric card in this embodiment.

Figure 1:
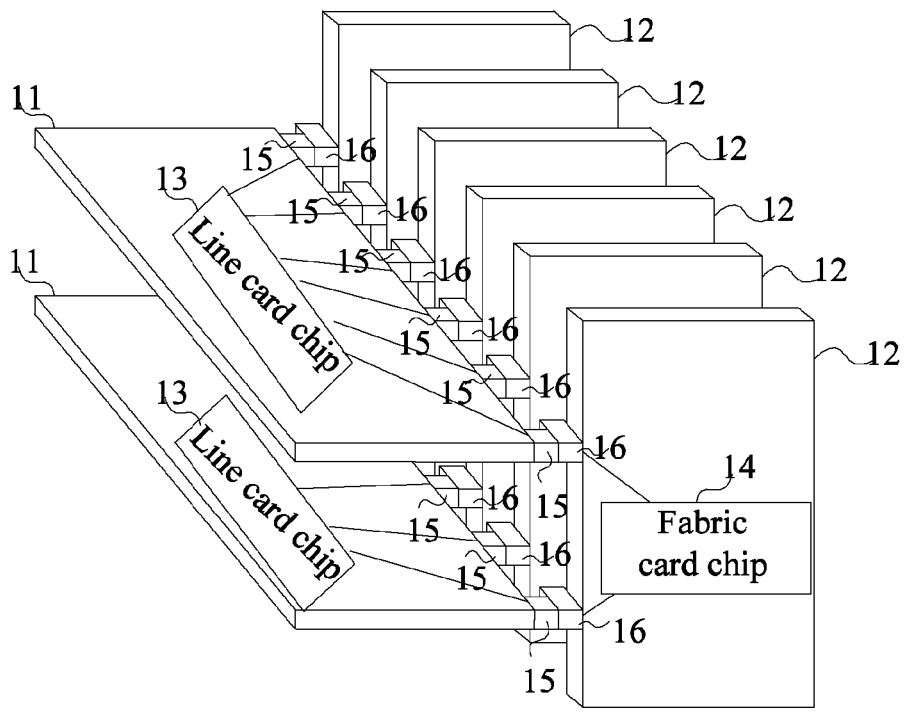
FIG. 1 is a schematic structural diagram of an orthogonal connection architecture of fabric cards and line cards in a conventional device.

In this embodiment, a spatial structure of the fabric card 31 is further limited based on the embodiment illustrated in FIG. 1, and the fabric card 31 is divided into one main card 301 and at least one connection card 302. However, the fabric card 41 provided in this embodiment also has beneficial effects of the fabric card 31 in the embodiment of the fabric card illustrated in FIG. 3.

In this embodiment, one fabric card is extended to one main card and at least one connection card. At least one fabric card chip on the main card separately connects to at least two fabric card connector groups on the main card and the at least one connection card, so that the at least two fabric card connector groups exchange data using the same fabric card chip. This fully utilizes a data exchange capability of the fabric card chip and improves utilization of system resources. In addition, the fabric card in this embodiment may be obtained by simply reconstructing the existing fabric card, thereby reducing costs.

Further, in the embodiment illustrated in FIG. 4, the main card 301 and the at least one connection card 302 may be fixed using a rigid connection. This may facilitate installation of a fabric card 41 and avoids impact on a connection caused by stress on a connection wire between the fabric card chip 311 and the connection card 302. The rigid connection may specifically be a connection manner in which the main card 301 and the at least one connection card 302 are fixedly connected using a frame or a connecting piece and a relative position relationship of the main card 301 and the at least one connection card 302 is not changed under external force.

Figure 5:
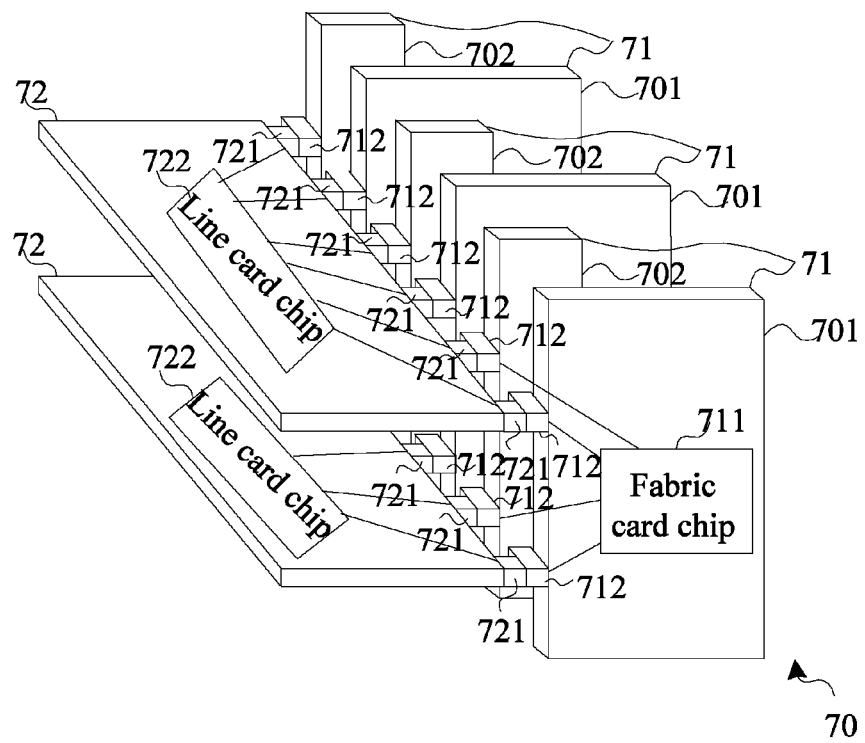
FIG. 5 is a schematic structural diagram of a first embodiment of a communications device according to an embodiment of this application.

FIG. 5 is a schematic structural diagram of a first embodiment of a communications device according to an embodiment of this application. As shown in FIG. 5, a communications device 70 in this embodiment includes at least one fabric card 71 and at least two line cards 72. Each line card 72 in the at least two line cards 72 includes at least two line card connectors 721. The number of fabric card connectors 712 in each fabric card connector group on the at least one fabric card 71 is the same, and the number of fabric card connectors 712 in each fabric card connector group is not less than the number of the at least two line cards 72. The number of the at least two line card connectors 721 in each line card 72 is the same as the total number of fabric card connector groups on the at least one fabric card. Each fabric card connector group connects to each line card 72 using only one fabric card connector 712 and one line card connector 721.

In FIG. 5, an example in which three fabric cards 71 and two line cards 72 exist and each line card 72 includes six line card connectors 721 is used for description. Further, the fabric card 71 with a structure that is the same as that of the fabric card 41 shown in FIG. 4 is used for description. One fabric card 71 is used as an example. The fabric card 71 includes a main card 701 and a connection card 702. The main card 701 includes a fabric card chip 711, and the line card 72 includes a line card chip 722. The main card 701 includes two fabric card connectors 712 that separately connect to the two line cards 72, and the connection card 702 includes two fabric card connectors 712 that separately connect to the two line cards 72. The fabric card chip 711 on the main card 701 connects to all fabric card connectors 712 on the main card 701 and the connection card 702. In addition, the line card chip 722 on each line card 72 connects to all line card connectors 721 on the line card 72.

Besides the fabric card 41 shown in FIG. 4, the fabric card in the communications system provided in this embodiment of this application may further use another structure, such as a structure shown in FIG. 2 or FIG. 3.

The communications device shown in FIG. 5 may implement, by arranging three fabric cards and two line cards, a function that is generally implemented using six fabric cards and two line cards, thereby saving system resources.

In this embodiment, at least one fabric card chip and at least two fabric card connector groups are arranged on one fabric card in the communications device; at least one fabric card chip on the fabric card connects to the at least two fabric card connector groups, and connects to at least two line card connectors of each line card using the connected at least two fabric card connector groups. This fully utilizes a data exchange capability of the fabric card chip and improves utilization of system resources.

The communications device 71 shown in FIG. 5 may further include a backplane.

At least two fabric card slots and at least two line card slots are arranged on the backplane. Each fabric card socket in each fabric card slot separately connects to one line card slot in different line card slots, and each line card socket in each line card slot separately connects to one fabric card socket in different fabric card slots. Each fabric card connector group on each fabric card separately corresponds to one fabric card slot on the backplane, and at least two fabric card connectors in each fabric card connector group connect to at least two fabric card sockets in the corresponding fabric card slot in one-to-one correspondence. Each line card separately corresponds to one line card slot on the backplane, and at least two line card connectors in each line card connect to at least two line card sockets in the corresponding line card slot in one-to-one correspondence.

The fabric card and the line card in the conventional communications device are connected using the backplane. Therefore, a backplane is added based on the communications device shown in FIG. 5, to fully utilize a data exchange capability of the fabric card chip and save system resources only by changing a structure of the existing fabric card in the communications device.

Finally, it should be noted that the foregoing embodiments are merely intended for describing the technical solutions of this application rather than limiting this application. Although this application is described in detail with reference to the foregoing embodiments, a person of ordinary skill in the art may still make modifications to the technical solutions described in the foregoing embodiments or make equivalent replacements to some or all technical features thereof. Therefore, the protection scope of this application shall be subject to the protection scope of the claims.

What is claimed is:

1. A fabric card, comprising:
at least one fabric card chip;
at least two fabric card connector groups,
wherein each fabric card connector group comprises at least two fabric card connectors,
wherein the number of the fabric card chip(s) is less than the number of the at least two fabric card connector groups,
wherein each fabric card chip connects to all fabric card connectors,
wherein all fabric card connectors that connect to the fabric card chip exchange data using the fabric card chip,
wherein one of the fabric card connectors is configured to exchange data only with other fabric card connectors in the same fabric card connector group to which the fabric card connector belongs,
wherein the fabric card comprises one main card and at least one connection card,
wherein the number of the at least two fabric card connector groups minus the number of the at least one connection card equals one, wherein the at least one fabric card chip resides on the main card,
wherein one fabric card connector group of the at least two fabric card connector groups is arranged on the main card,
wherein one fabric card connector group of the at least two fabric card connector groups is arranged on each connection card of the at least one connection card,
wherein at least two fabric card slots and at least two line card slots are arranged on a backplane,
wherein each fabric card socket in each fabric card slot separately connects to one line card socket in different line card slots,
wherein each line card socket in each line card slot connects to one fabric card socket in different fabric card slots,
wherein each fabric card connector group on each fabric card separately corresponds to one fabric card slot on the backplane,
wherein at least two fabric card connectors in each fabric card connector group connect to at least two fabric card sockets in a fabric card slot, which corresponds to the fabric card connector group to which the at least two fabric card connectors belongs in one-to-one correspondence,
wherein each line card separately corresponds to one line card slot on the backplane, and
wherein at least two line card connectors in each line card connect to at least two line card sockets in a line card slot, which corresponds to the line card to which the at least two line card connectors belongs in one-to-one correspondence.

2. The fabric card according to claim 1, wherein all fabric card connectors in each fabric card connector group on the at least one connection card connect to at least one fabric card chip on the main card using a connection wire.

3. The fabric card according to claim 2, wherein the one main card and the at least one connection card are fixed together using a rigid connection.

4. A communications device, comprising:
at least one fabric card;
at least two line cards; and
a backplane,
wherein each fabric card comprises at least one fabric card chip and at least two fabric card connector groups,
wherein each fabric card connector group comprises at least two fabric card connectors,
wherein the number of the fabric card chip(s) is less than the number of the at least two fabric card connector groups, wherein each fabric card chip connects to all fabric card connectors, wherein all fabric card connectors that connect to the fabric card chip exchange data using the fabric card chip, wherein one of the fabric card connectors in one fabric card connector group exchanges data only with other fabric card connector in the same fabric card connector group to which the fabric card connector belongs;

wherein each line card of the at least two line cards comprises at least two line card connectors; and wherein the number of fabric card connectors in each fabric card connector group on the at least one fabric card is the same, wherein the number of fabric card connectors in each fabric card connector group is not less than the number of the at least two line cards, wherein the number of the at least two line card connectors in each line card is the same as the number of fabric card connector groups on the at least one fabric card, wherein each fabric card connector group connects to each line card only using one fabric card connector and one line card connector, wherein at least two fabric card slots and at least two line card slots are arranged on the backplane, wherein each fabric card socket in each fabric card slot separately connects to one line card socket in different line card slots, wherein each line card socket in each line card slot connects to one fabric card socket in different fabric card slots, wherein each fabric card connector group on each fabric card separately corresponds to one fabric card slot on the backplane, wherein at least two fabric card connectors in each fabric card connector group connect to at least two fabric card sockets in a fabric card slot, which corresponds to the fabric card connector group to which the at least two fabric card connectors belongs in one-to-one correspondence, wherein each line card separately corresponds to one line card slot on the backplane, and wherein at least two line card connectors in each line card connect to at least two line card sockets in a line card slot, which corresponds to the line card to which the at least two line card connectors belongs in one-to-one correspondence.

5. The communications device according to claim 4, wherein the fabric card comprises one main card and at least one connection card, wherein the number of the at least two fabric card connector groups minus the number of the at least one connection card equals one, wherein the at least one fabric card chip resides on the main card, wherein one fabric card connector group of the at least two fabric card connector groups is arranged on the main card, and wherein one fabric card connector group of the at least two fabric card connector groups is arranged on each connection card of the at least one connection card.

6. The communications device according to claim 5, wherein all fabric card connectors in each fabric card connector group on the at least one connection card connect to at least one fabric card chip on the main card using a connection wire.

7. The communications device according to claim 6, wherein the one main card and the at least one connection card are fixed together using a rigid connection.

8. The communications device according to claim 4, wherein the fabric card comprises one main card and at least one connection card, wherein the number of the at least two fabric card connector groups minus the number of the at least one connection card equals one, wherein the at least one fabric card chip resides on the main card, wherein one fabric card connector group of the at least two fabric card connector groups is arranged on the main card, and wherein one fabric card connector group of the at least two fabric card connector groups is arranged on each connection card of the at least one connection card.

9. The communications device according to claim 8, wherein all fabric card connectors in each fabric card connector group on the at least one connection card connect to at least one fabric card chip on the main card using a connection wire.

10. The communications device according to claim 9, wherein the one main card and the at least one connection card are fixed together using a rigid connection.

* * * * *